United States Patent
Choi et al.

(10) Patent No.: US 12,548,366 B2
(45) Date of Patent: Feb. 10, 2026

(54) HOME APPLIANCE AND CONTROL METHOD THEREOF

(71) Applicant: LG ELECTRONICS INC., Seoul (KR)

(72) Inventors: Junmyung Choi, Seoul (KR); Baekeun Kwon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 328 days.

(21) Appl. No.: 18/035,411

(22) PCT Filed: May 17, 2021

(86) PCT No.: PCT/KR2021/006117
§ 371 (c)(1),
(2) Date: May 4, 2023

(87) PCT Pub. No.: WO2022/097859
PCT Pub. Date: May 12, 2022

(65) Prior Publication Data
US 2023/0410546 A1 Dec. 21, 2023

(30) Foreign Application Priority Data

Nov. 5, 2020 (KR) .......................... 10-2020-0146515

(51) Int. Cl.
*G06V 40/10* (2022.01)
*F24F 11/79* (2018.01)
(Continued)

(52) U.S. Cl.
CPC .............. *G06V 40/10* (2022.01); *F24F 11/79* (2018.01); *G06T 7/60* (2013.01); *G06T 7/70* (2017.01);
(Continued)

(58) Field of Classification Search
CPC ...... G06V 40/10; G06V 10/25; G06V 10/751; G06T 7/70; G06T 7/60;
(Continued)

(56) References Cited

U.S. PATENT DOCUMENTS

2012/0294526 A1* 11/2012 Yasan ........................ G06T 5/70
382/167
2015/0036884 A1 2/2015 Ivanchenko
(Continued)

FOREIGN PATENT DOCUMENTS

JP 2010-266169 A * 11/2010 ............... G06T 1/00
JP 2015-078802 4/2015
(Continued)

OTHER PUBLICATIONS

International Search Report dated Sep. 2, 2021 issued in Application No. PCT/KR2021/006117.
(Continued)

*Primary Examiner* — David F Dunphy
(74) *Attorney, Agent, or Firm* — KED & ASSOCIATES

(57) ABSTRACT

Disclosed are a home appliance and a control method thereof. The disclosed home appliance performs a first home appliance operation for objects corresponding to shapes of a human body in a space, and thereafter, excludes an object other than a user from among the objects and performs a second home appliance operation for the user only. In this case, the first home appliance operation and the second home appliance operation are not simultaneously performed and are different from each other.

18 Claims, 13 Drawing Sheets

(51) Int. Cl.
*G06T 7/60* (2017.01)
*G06T 7/70* (2017.01)
*G06V 10/25* (2022.01)
*G06V 10/75* (2022.01)
*F24F 120/12* (2018.01)

(52) U.S. Cl.
CPC ............ *G06V 10/25* (2022.01); *G06V 10/751* (2022.01); *F24F 2120/12* (2018.01); *G06T 2207/20081* (2013.01); *G06T 2207/30196* (2013.01)

(58) Field of Classification Search
CPC . G06T 2207/20081; G06T 2207/30196; F24F 11/79; F24F 2120/12

See application file for complete search history.

(56) References Cited

U.S. PATENT DOCUMENTS

| | | |
|---|---|---|
| 2018/0209681 A1 | 7/2018 | Song et al. |
| 2019/0309968 A1 | 10/2019 | Nalajala et al. |
| 2019/0309978 A1 | 10/2019 | Song et al. |
| 2020/0103978 A1 | 4/2020 | Mixter et al. |

FOREIGN PATENT DOCUMENTS

| | | |
|---|---|---|
| KR | 10-2018-0051729 | 5/2018 |
| KR | 10-2018-0071031 | 6/2018 |
| KR | 10-2019-0118337 | 10/2019 |
| KR | 10-2121785 | 6/2020 |

OTHER PUBLICATIONS

Extended European Search Report dated Sep. 9, 2024, issued in Application No. 21889327.9.

\* cited by examiner

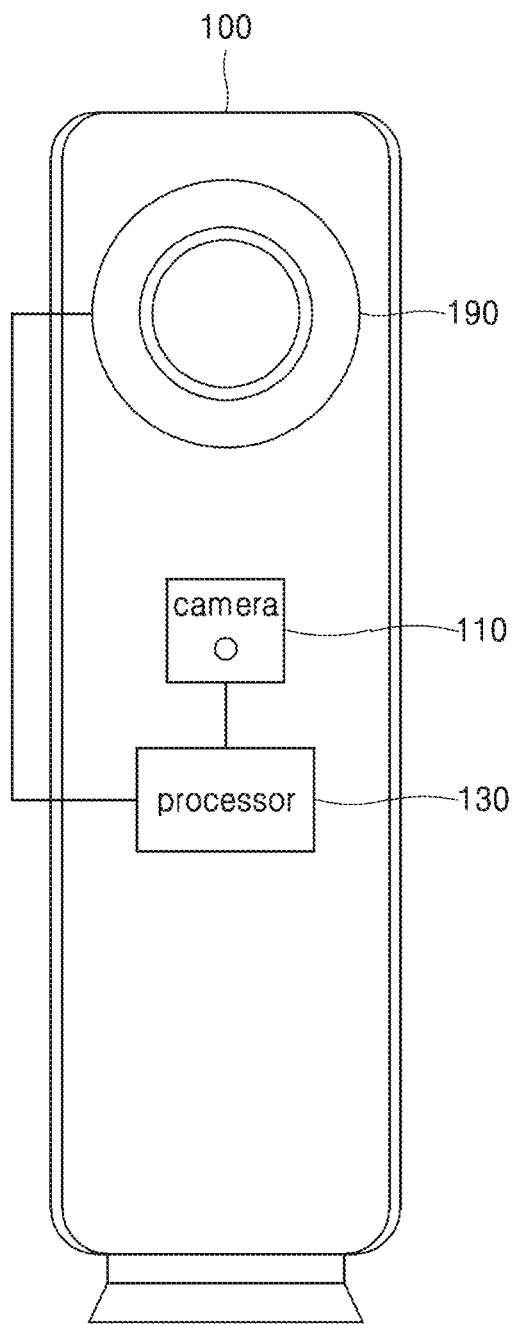

[FIG. 2]
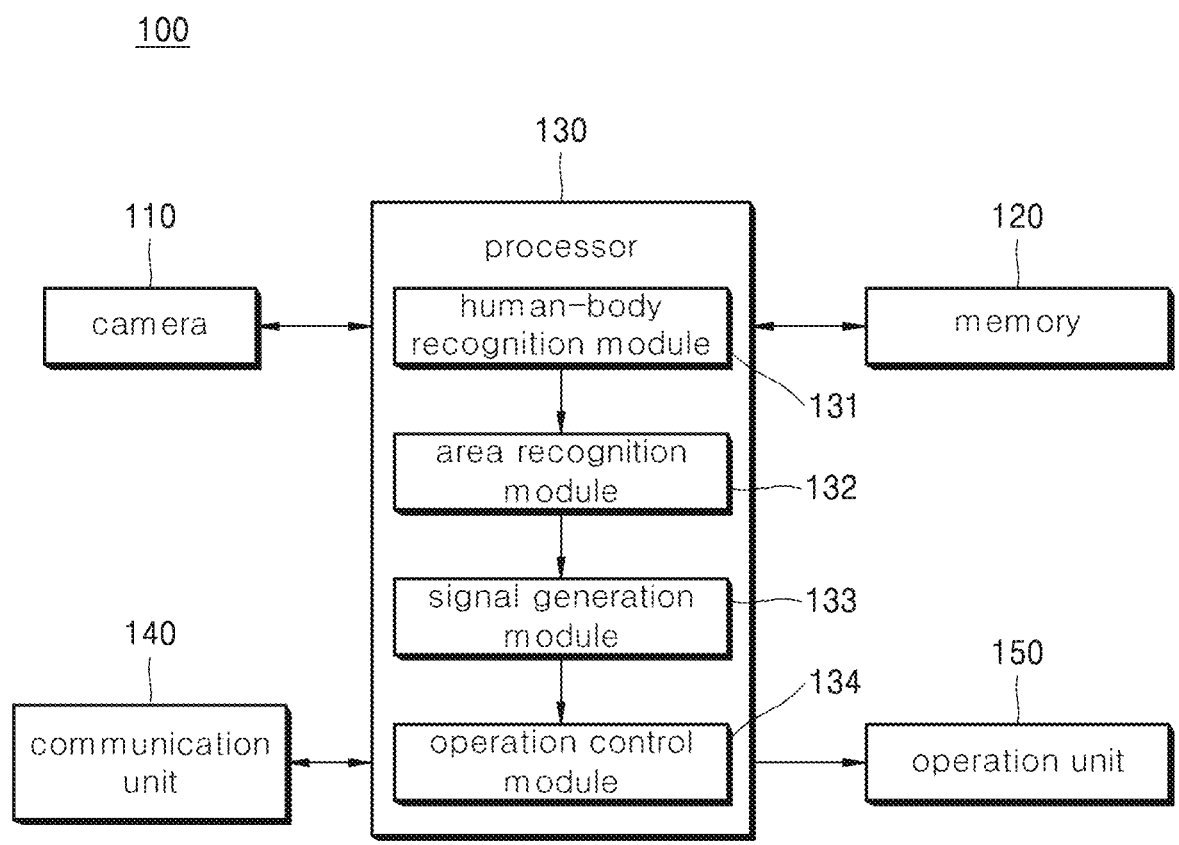

[FIG. 3]
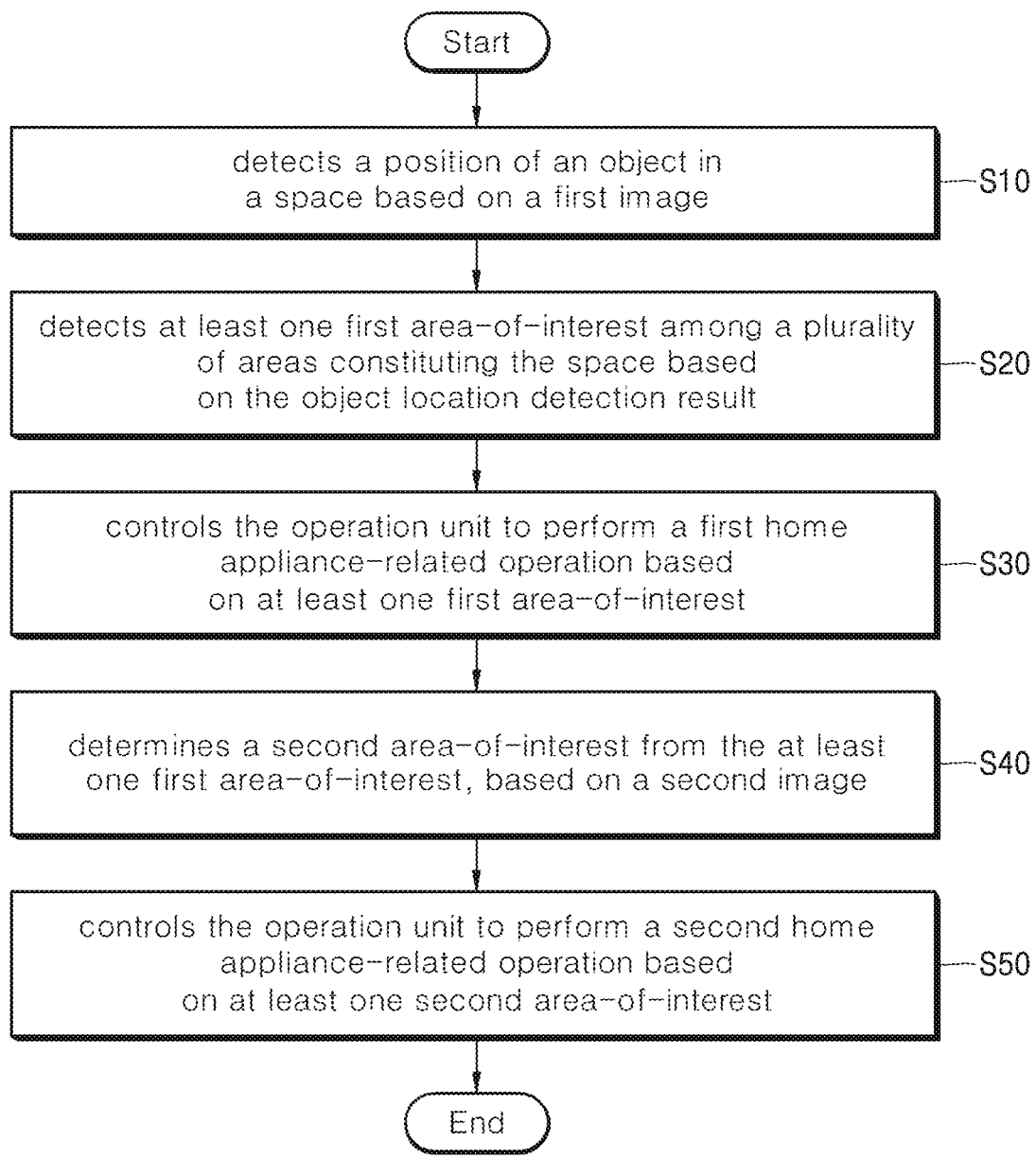

[FIG. 4]
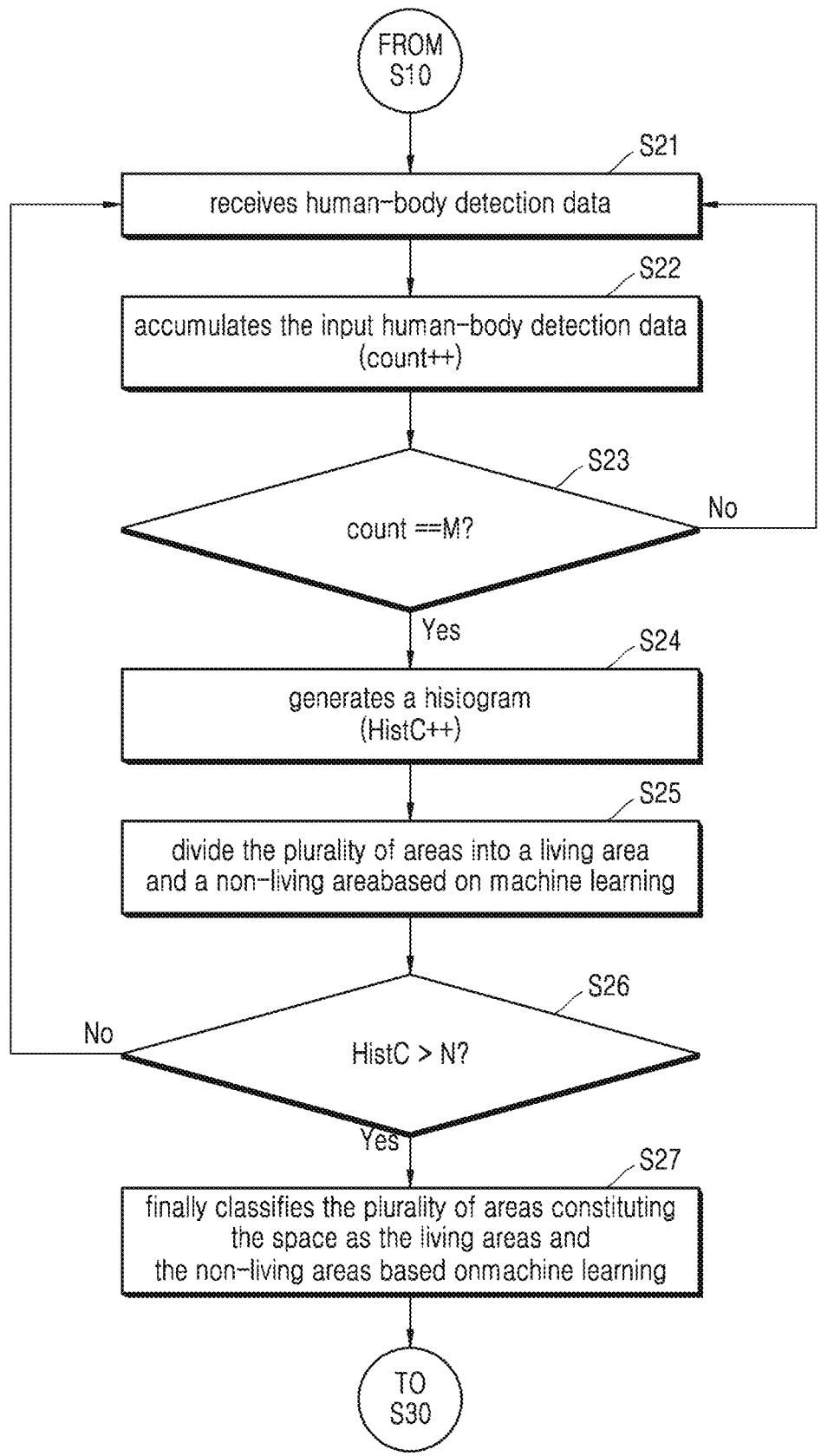

[FIG. 5]
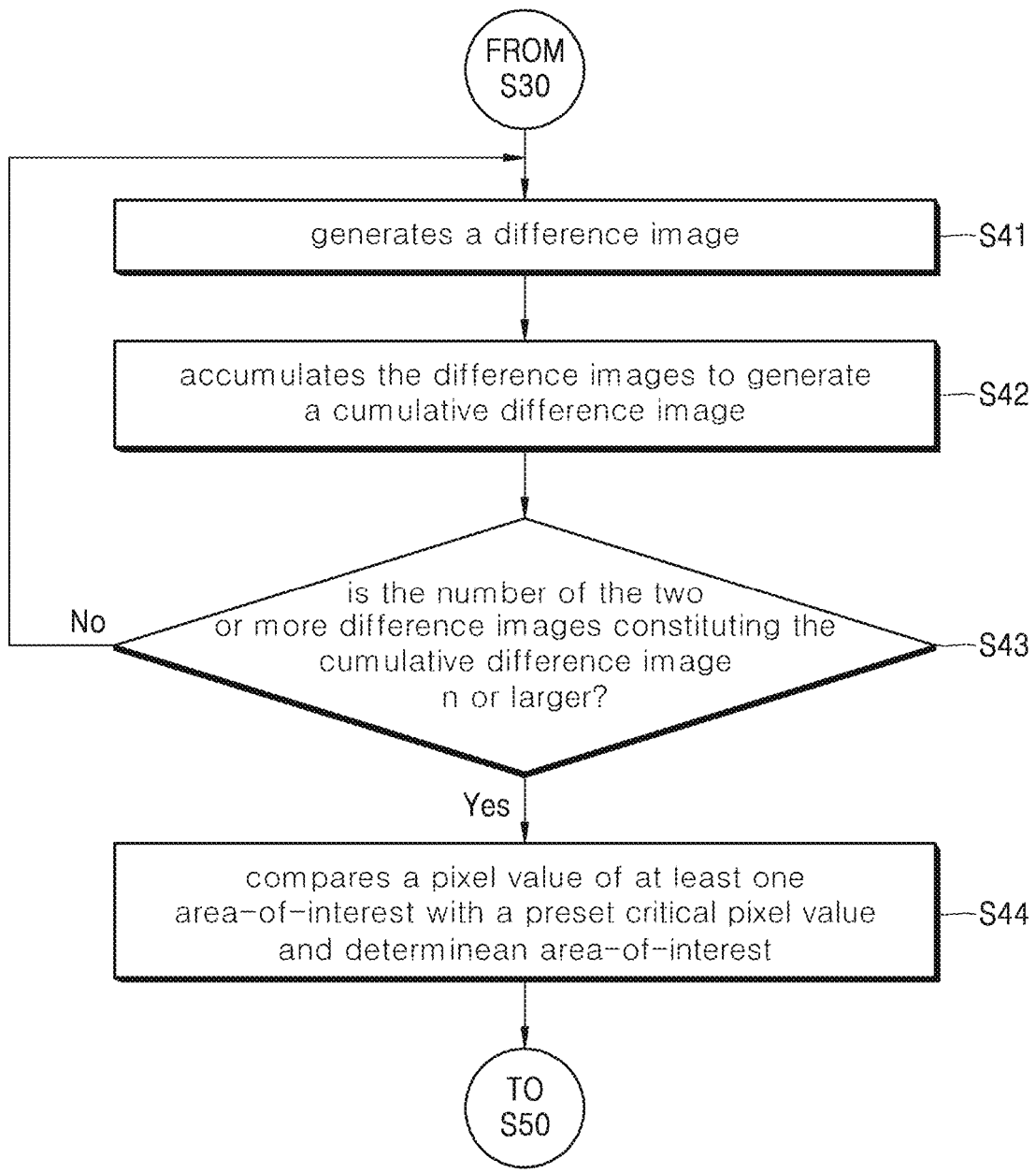

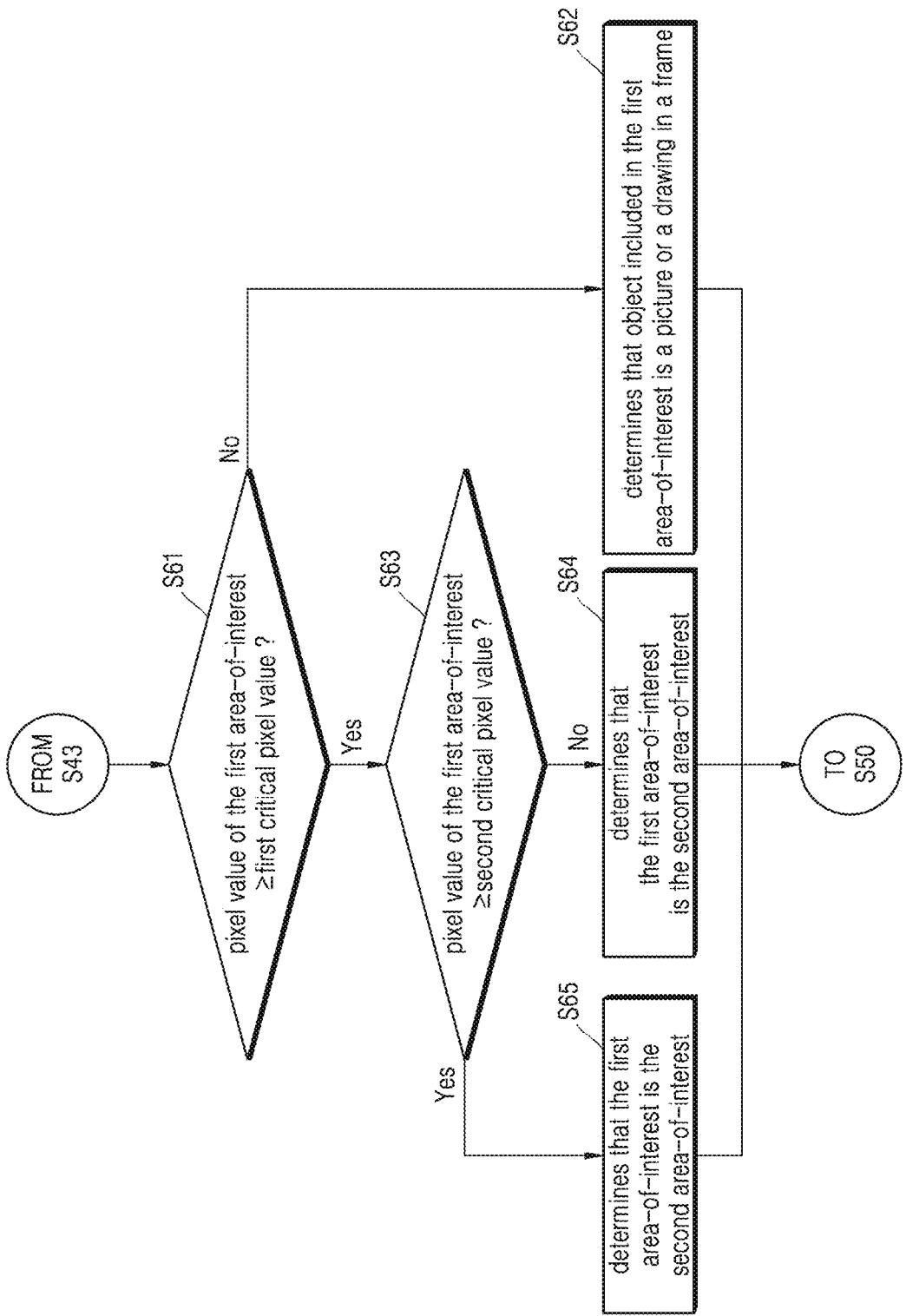
[FIG. 6]

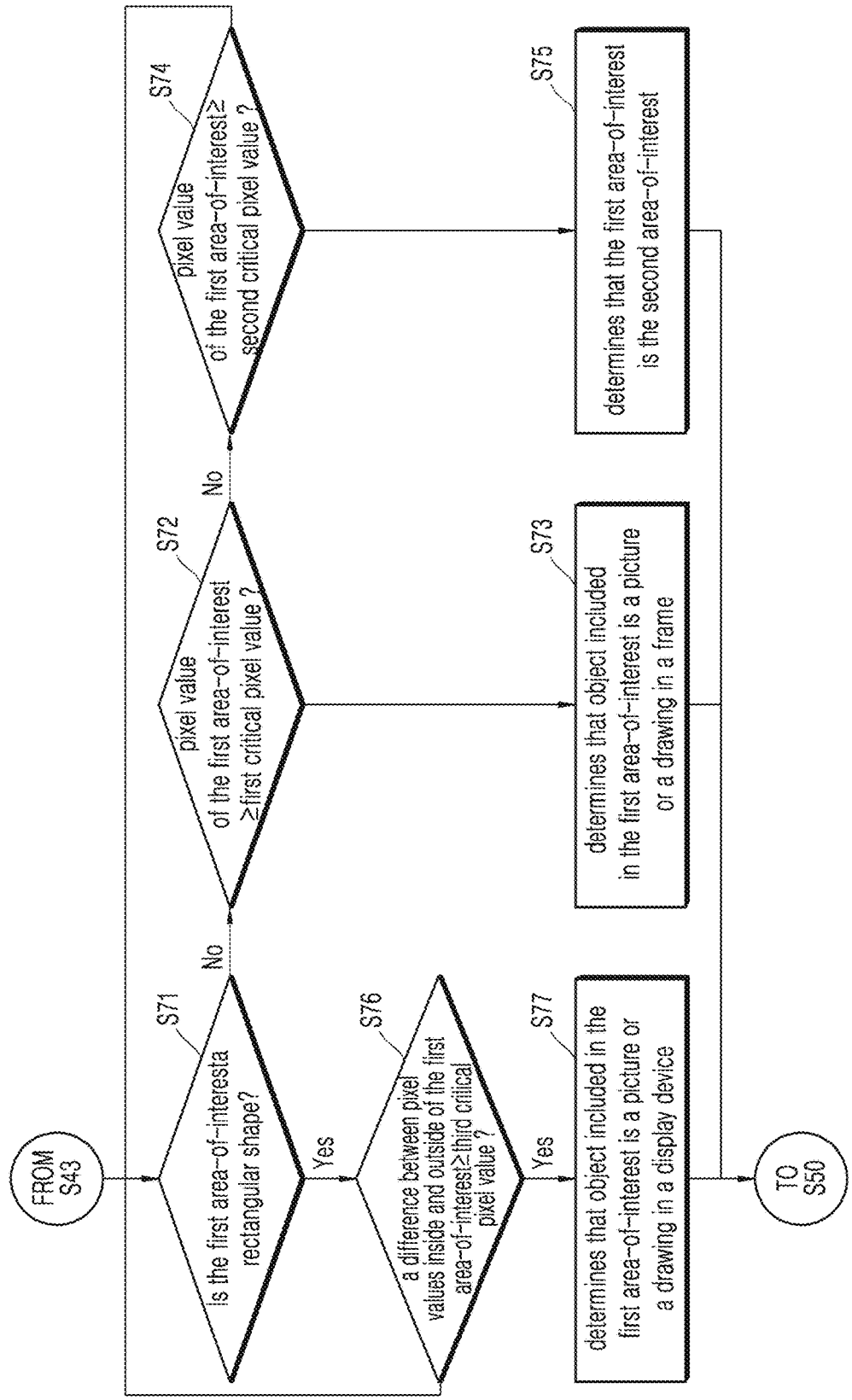

[FIG. 8A]
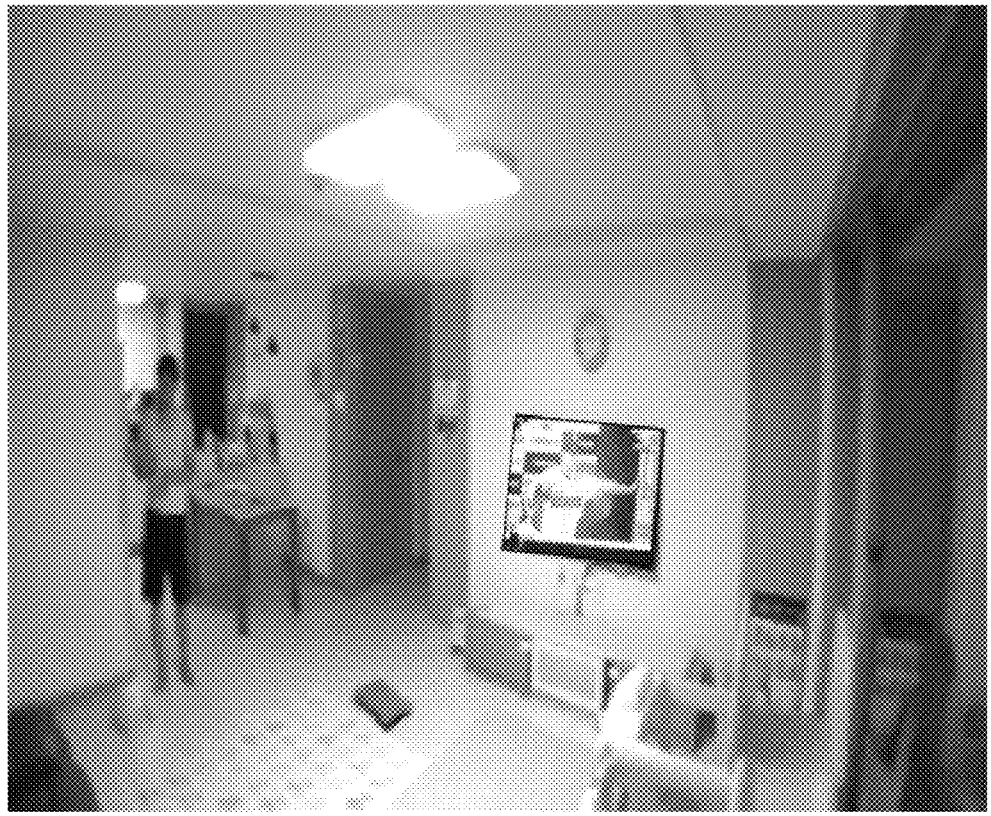
[FIG. 8B]

[FIG. 9]
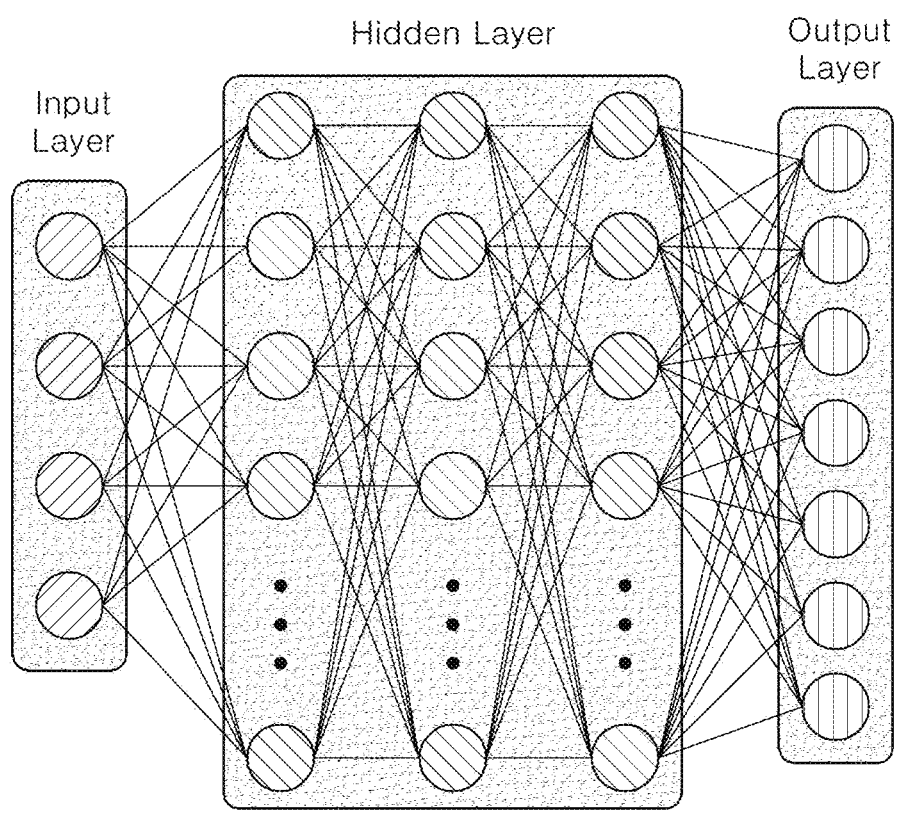

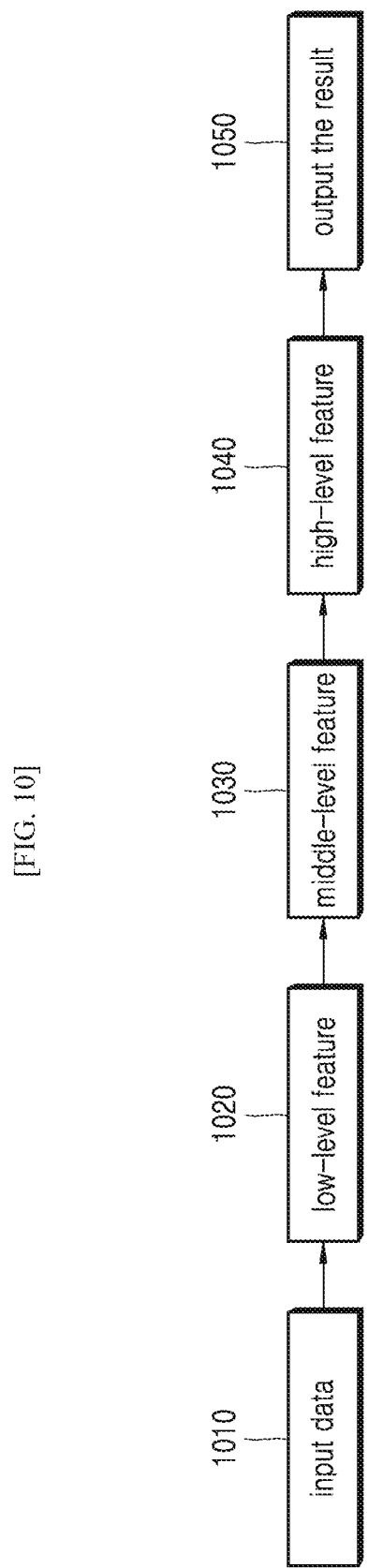
[FIG. 10]

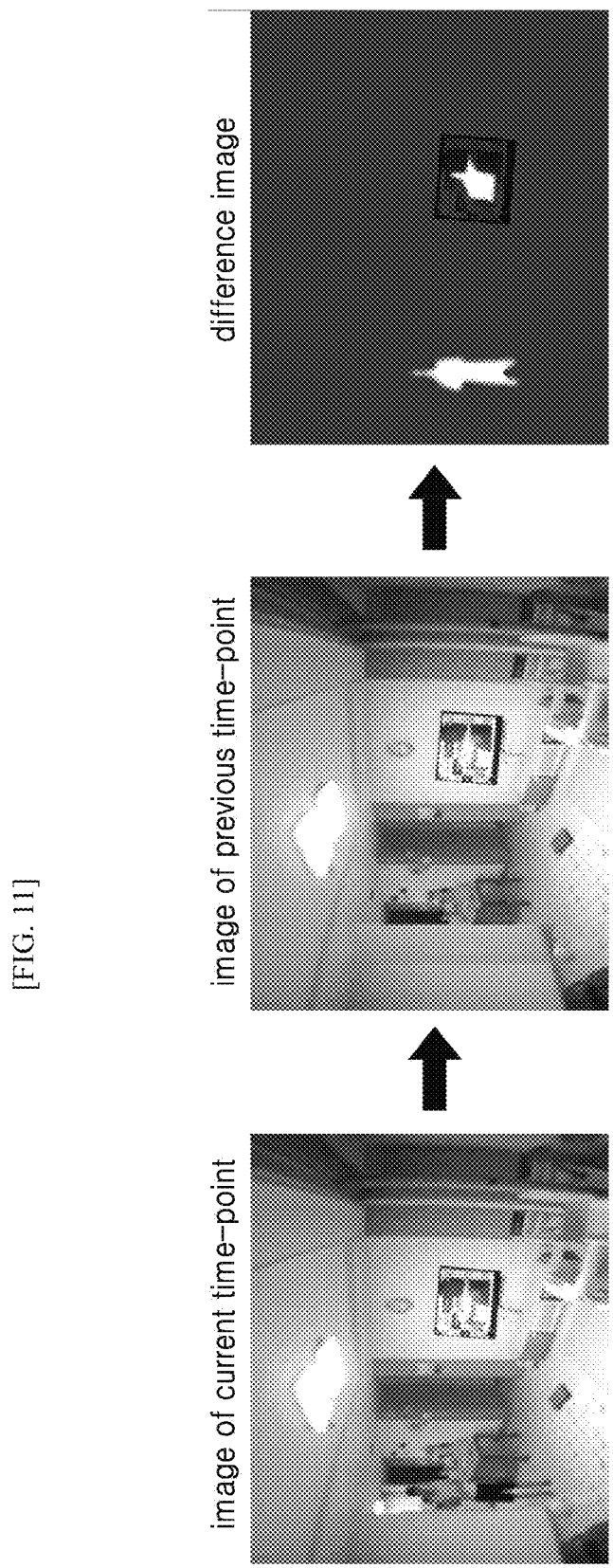
[FIG. 11]

[FIG. 12A]
[FIG. 12B]

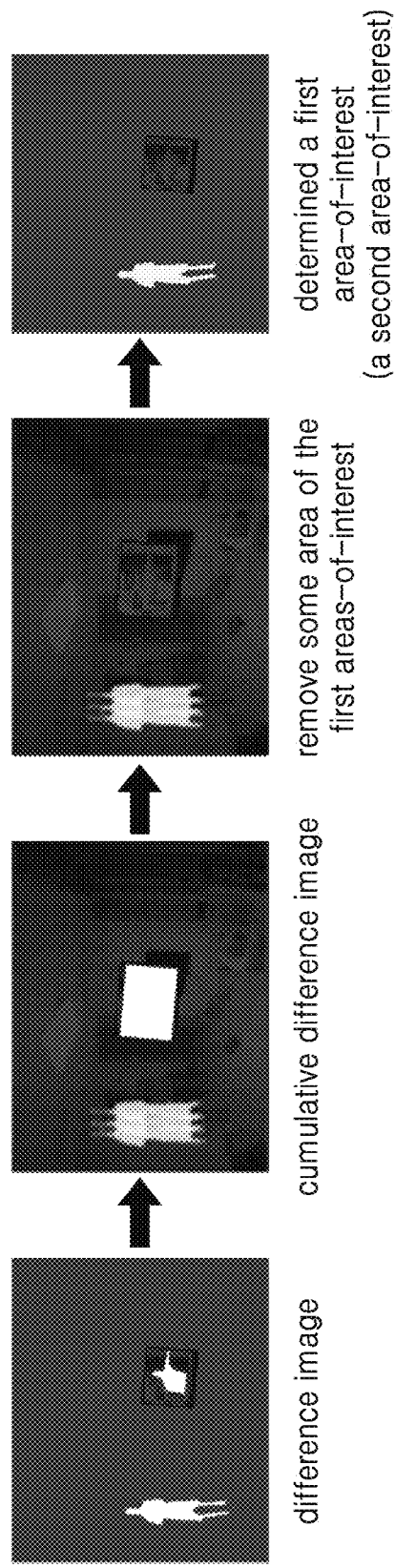
[FIG. 13]

HOME APPLIANCE AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2021/006117, filed May 17, 2021, which claims priority to Korean Patent Application No. 10-2020-0146515, filed Nov. 5, 2020, whose entire disclosures are hereby incorporated by reference.

TECHNICAL FIELD

The present disclosure relates to a home appliance and a control method thereof.

BACKGROUND

An air conditioner is an apparatus that controls an indoor temperature and purifies an indoor air by discharging cold and hot air into an indoor space to create a pleasant indoor environment. Installing the air conditioner may allow a more comfortable indoor environment to be provided to humans.

The air conditioner includes an indoor unit installed indoors and including a heat exchanger, and an outdoor unit installed outdoors and including a compressor and a heat exchanger and supplying refrigerant to the indoor unit. In the air conditioner, the indoor unit and the outdoor unit are controlled in a separate manner. In the air conditioner, at least one indoor unit may be connected to one outdoor unit. The air conditioner operates in either a cooling mode or a heating mode depending on a requested operation condition.

In order to control a direction of wind discharged into the indoor space, wind direction control means is disposed in an outlet hole of the air conditioner. A user may change the wind direction by manipulating a wind direction setting button disposed on a remote control or the like.

In a conventional air conditioner, the wind direction is adjusted through manual operation as described above. However, when the user frequently moves indoors, the wind direction should be changed every time, such that user's inconvenience may be caused.

Therefore, recently, a technique for controlling a wind speed or air current according to a position of the user (i.e., occupant) located in the indoor space has been developed.

Prior art 1 (KR 10-2018-0071031, AIR CONDITIONER AND CONTROL METHOD THEREOF) acquires an image through a camera, and based on the acquired image, recognizes an area in which the occupant is located in an indoor space divided into a plurality of areas, identifies a living area among the plurality of areas using the location recognition result of the occupant as an input into data pre-learned with machine learning, and controls airflow based on the identified living area.

In prior art 2 (KR 10-2019-0118337, AIR CONDITIONER WITH REGION SELECTIVE OPERATION BASED ON ARTIFICIAL INTELLIGENCE, CLOUD SERVER, AND OPERATION METHOD THEREOF), a concentrated air blowing area is determined in response to a distance and a direction of an occupant sensed in an air blowing area of the air conditioner, and an area other than the air blowing area is distinguished by determining the area as a non-concentrated air blowing area. Moreover, the air conditioner is indicated to be operated in a concentrated operation mode with respect to the concentrated air blowing area, and is operated in an operation mode distinguished from the concentrated operation mode with respect to the concentrated air blowing area and the non-concentrated air blowing area when the operation is completed in the concentrated operation mode.

However, the prior arts as described above have a problem in that the airflow cannot be effectively controlled because the accuracy of detecting the position of the occupant (human-body) is low. In particular, a picture frame, a display device (in one example, a TV), etc. may exist in the indoor space, and thus a photograph contained in the picture frame or a human-body shape displayed on the display device may be mistaken as the user, resulting in poor human-body detection accuracy. Therefore, a scheme for more accurately detecting the human-body is required.

DISCLOSURE

Technical Purpose

A purpose of the present disclosure is to provide a home appliance and a control method thereof capable of more accurately detecting an occupant existing in a space and performing a home appliance-related operation based on a user's location.

A purpose of the present disclosure is to provide a home appliance and a control method thereof that can clearly distinguish a user existing in a space and a human-body displayed on a picture frame or a display device from each other.

A purpose of the present disclosure is to provide a home appliance and a control method thereof that can solve the user's inconvenience in using the home appliance.

The purposes of the present disclosure are not limited to the above-mentioned purposes, and other purposes and advantages of the present disclosure that are not mentioned may be understood by the following descriptions, and may be more clearly understood based on embodiments of the present disclosure.

Technical Solution

The home appliance and the control method thereof according to one embodiment of the present disclosure perform a first home appliance-related operation on objects corresponding to a shape of a human-body in the space, and performs a second home appliance-related operation only on a user in the space among the objects, wherein the first and second home appliance-related operations are different from each other. In this regard, the first and second home appliance-related operations are not performed at the same time and different from each other.

Specifically, the home appliance and the control method thereof according to one embodiment of the present disclosure detect at least one first area-of-interest containing the object from among a plurality of areas constituting the space, and perform the first home appliance-related operation based on the at least one first area-of-interest for a first time period; and detect at least one second area-of-interest in which the object is not the user-similar object but the user from among the at least one first area-of-interest, and perform the second home appliance-related operation based on the at least one second area-of-interest for a second time period.

Further, the home appliance and the control method thereof according to one embodiment of the present disclosure may distinguish a user existing in a space and a human body displayed on a picture frame or a display device from each other, based on the cumulative difference image, and thus may simply and efficiently distinguish the user from the user-like object.

A home appliance according to one embodiment of the present disclosure includes a memory for storing therein at least one instruction; a processor configured to execute the at least one instruction; and an operation unit controlled by the processor so as to perform a home appliance-related operation, wherein the processor is configured to: receive images of a space obtained by a camera from the camera; control the operation unit to perform a first home appliance-related operation on objects corresponding to a shape of a human-body in the space, based on a first image among the images; and control the operation unit to perform a second home appliance-related operation only on a user in the space among the objects, based on a second image among the images, wherein the first and second home appliance-related operations are different from each other, wherein the second image is obtained after the first image.

In this regard, the processor is configured to: detect at least one first area-of-interest containing the object from among a plurality of areas constituting the space, based on the first image, and control the operation unit to perform the first home appliance-related operation based on the at least one first area-of-interest; and detect at least one second area-of-interest in which the object is the user from among the at least one first area-of-interest, based on the second image, and control the operation unit to perform the second home appliance-related operation based on the at least one second area-of-interest.

Further, the objects include the user and a user-similar object, wherein the user-similar object is an image or a picture of a human-body contained in a picture frame, and an image or a picture of a human-body displayed on a display device.

Further, the processor is configured to: generate a cumulative difference image based on the second images sequentially obtained by the camera for a predetermined time duration, and detect the at least one second area-of-interest based on the cumulative difference image.

Further, the cumulative difference image corresponds to an average image of a plurality of difference images, wherein the difference image is an image corresponding to a difference between an image at a first time-point and an image at a second time-point before the first time-point.

Further, the difference image is an image corresponding to a difference between a grayscale image of the image at the first time-point and a grayscale image of the image at the second time-point.

Further, the processor is configured to compare a pixel value of the first area-of-interest with a preset critical pixel value, and to detect the at least one second area-of-interest based on the comparing result.

Further, the critical pixel value includes a first critical pixel value and a second critical pixel value, wherein when a pixel value of one of the at least one first area-of-interest is greater than the first critical pixel value and is smaller than the second critical pixel value, the processor is configured to determine said one first areas-of-interest as the second area-of-interest.

Further, the critical pixel value includes a first critical pixel value and a second critical pixel value, wherein when a pixel value of one of the at least one first area-of-interest is smaller than the first critical pixel value or is greater than the second critical pixel value, the processor is configured to determine that said one first areas-of-interest is not the second area-of-interest.

Further, when the pixel value of said one first area-of-interest is smaller than the first critical pixel value, the processor is configured to determine that the object contained in said one first area-of-interest is a photo or a picture of a human-body contained in a picture frame, wherein when the pixel value of said one first area-of-interest is greater than the second critical pixel value, the processor is configured to determine that the object contained in said one first area-of-interest is a photo or a picture displayed on a display device.

Further, the processor is configured to detect a quadrangular shape in the cumulative difference image, and to detect the second area-of-interest, further based on the detected quadrangular shape. In this case, the critical pixel value includes a second critical pixel value and a third critical pixel value, wherein when one of the at least one first area-of-interest has a rectangular shape, and a pixel value inside the first area-of-interest of the rectangular shape is greater than the second critical pixel value, and a difference between a pixel value inside the first area-of-interest of the rectangular shape and a pixel value outside the first area-of-interest of the rectangular shape is greater than the third critical pixel value, the processor is configured to determine that said one first area-of-interest is not the second area-of-interest.

Further, the processor is configured to detect the at least one first area-of-interest using the first image as an input to data pre-learned via machine learning.

A method for controlling a home appliance according to another embodiment of the present disclosure includes receiving images of a space acquired by a camera therefrom; performing a first home appliance-related operation on objects corresponding to a shape of a human-body in the space based on a first image among the images; and performing a second home appliance-related operation only on a user in the space among the objects based on a second image among the images, wherein the first and second home appliance-related operations are different from each other, wherein the second image is obtained after the first image.

Advantageous Effects

According to the present disclosure, the home appliance and the control method thereof can determine whether the human-body present in the image is the user (occupant) or the human-body displayed on the picture frame or the display device, based on analysis of the pixel value of the image, and thus can detect the human-body present in the image more accurately.

Further, according to the present disclosure, the home appliance and the control method thereof can more accurately detect the user in the image such that user convenience may be provided to the user.

Further, according to the present disclosure, the home appliance and the control method thereof can accurately detect the user existing in the space to prevent an error occurring when providing the home appliance-related operation based on the user location.

In addition to the above effects, specific effects of the present disclosure are described together while describing specific details for carrying out the present disclosure.

DESCRIPTION OF DRAWINGS

FIG. 1 is a diagram showing a simplified conceptual diagram of an air conditioner according to an embodiment of the present disclosure.

FIG. 2 is a block diagram showing a control relationship between major components of an air conditioner according to an embodiment of the present disclosure.

FIGS. 3 to 7 are flowcharts of a control method of an air conditioner according to an embodiment of the present disclosure.

FIGS. 8A and 8B are diagrams showing an image of an indoor space according to an embodiment of the present disclosure.

FIG. 9 and FIG. 10 are diagrams for illustrating a concept of an artificial neural network (ANN).

FIG. 11 is a diagram showing an example of a difference image according to the present disclosure.

FIGS. 12A and 12B are diagrams showing an example of a cumulative difference image according to an embodiment of the present disclosure.

FIG. 13 is a diagram for illustrating a concept of detecting a second area-of-interest according to an embodiment of the present disclosure.

MODE FOR INVENTION

The above-described objects, features, and advantages are described in detail later with reference to the accompanying drawings, and accordingly, a person having ordinary knowledge in the technical field to which the present disclosure belongs may easily implement the technical idea of the present disclosure. In describing the present disclosure, when it is determined that a detailed description of a known component related to the present disclosure may unnecessarily obscure the gist of the present disclosure, the detailed description is omitted. Hereinafter, preferred embodiments according to the present disclosure will be described in detail with reference to the accompanying drawings. In the drawings, the same reference numerals are used to indicate the same or similar components.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof.

The present disclosure may be applied to an air conditioner that controls an indoor temperature and purifies indoor air. However, the present disclosure is not limited thereto, and the present disclosure may be applied to all home appliances that perform a specific home appliance-related operation based on an image acquired by a camera, such as a home robot (in one example, a robot cleaner), an oven, a refrigerator, a water purifier, a dishwasher, a washing machine, an air purifier, and the like.

In this regard, the control of the home appliance-related operation based on the image as described in the present disclosure may include turn on/off control of the home appliance, door opening and closing control, control of a display device or a lighting device installed on the home appliance, control of an operation range, an operation intensity, and an operation frequency of the home appliance, etc.

Hereinafter, for convenience of description, embodiments of the present disclosure are described based on an example in which the home appliance is an air conditioner.

FIG. 1 is a schematic conceptual diagram of an air conditioner according to an embodiment of the present disclosure. FIG. 2 is a block diagram showing a control relationship between major components of an air conditioner according to an embodiment of the present disclosure.

According to an embodiment of the present disclosure, an air conditioner 100 is embodied as a stand-alone air conditioner. However, the present disclosure is not limited thereto, and the present disclosure may be applied to air conditioners such as a wall-mounted air conditioner and a ceiling-mounted air conditioner in addition to the stand-alone air conditioner.

Referring to FIG. 1 and FIG. 2, the air conditioner 100 according to an embodiment of the present disclosure includes a camera 110, a memory 120, a processor 130, a communication unit 140, and an operation unit 150.

The camera 110 acquires an image of a space. The camera 110 may be attached to an outer surface (in one example, a front surface) of an indoor unit of the air conditioner 100. The space may be an indoor space. However, the present disclosure is not limited thereto.

In one example, an external camera may be installed inside the space. In this case, the image of the space taken from the external camera may be transmitted to the air conditioner 100 via the communication unit 140. In this case, the camera 110 may not be included in the air conditioner 100. Hereinafter, for convenience of illustration, it is assumed that the camera 110 is installed in the air conditioner 100.

The memory 120 may be a volatile and/or non-volatile memory, and stores therein instructions or data related to at least one component of the air conditioner 100 other than the memory. Further, the memory 120 may store therein an image used to control the air conditioner 100. In this regard, the image includes the image acquired from the camera 110 and an image obtained by processing the obtained image.

The processor 130 may include one or more of a central processing unit, an application processor, or a communication processor. The processor 130 may perform an operation or instructions and data processing related to control and/or communication of at least one component of the air conditioner 100 other than the processor. In particular, the processor 130 may receive the image acquired by the camera 110 and control the operation unit 150 based on the received image to control the flow of air.

A plurality of modules may be disposed in the processor 130.

In this regard, the module may mean a functional and structural combination of software to carry out the technical idea of the present disclosure. For example, the module may mean a logical unit of a predefined code and a resource for executing the predefined code.

In one example, the plurality of modules may include a human-body recognition module 131, an area recognition module 132, a signal generation module 133, and an operation control module 134.

The human-body recognition module 131 detects absence or presence of the user (an occupant), and a location of the user, based on the image acquired by the camera 110.

The area recognition module 132 detects at least one area-of-interest from a plurality of areas in the space based on the image acquired by the camera 110 and the user's location recognition result. In this regard, the area-of-interest corresponds to a living area. The living area is an area where the user lives in the space.

The area recognition module 132 detects only the area-of-interest containing the user among at least one area-of-interest, and removes an area-of-interest containing an object similar to the user. That is, the area recognition module 132 performs an operation for determining the area-of-interest. The object similar to the user is not contained in the determined area-of-interest, and only the user is contained therein. In other words, "determination of the area-of-interest" corresponds to "detection of a first area-of-interest in which the user is contained".

The signal generation module 133 generates a control signal for controlling an operation of the operation unit 150 based on the determined area-of-interest.

The operation control module 134 controls the operation unit 150 based on the control signal generated by the signal generation module 133.

An operation of the processor 130 that controls the air conditioner 100 will be described in more detail below.

The communication unit 140 may communicate with a predetermined server. In this regard, the communication unit 140 may include a mobile communication module, a short-range communication module, and the like.

The mobile communication module is a module that transmits and receives a radio signal on a mobile communication network established according to standards or communication protocols for mobile communication. In one example, the mobile communication network may be established based on Global System for Mobile communication (GSM), Code Division Multi Access (CDMA), Code Division Multi Access 2000 (CDMA2000), Enhanced Voice-Data Optimized or Enhanced Voice-Data Only (EV-DO), WCDMA (Wideband CDMA), High Speed Downlink Packet Access (HSDPA), High Speed Uplink Packet Access (HSUPA), Long Term Evolution (LTE), Long Term Evolution-Advanced (LTE-A), or the like.

The short-range communication module is configured for short-range communication, and may be based on at least one of Bluetooth, Radio Frequency Identification (RFID), Infrared Data Association (IrDA), UWB (Ultra Wideband), ZigBee, NFC (Near Field Communication), Wi-Fi (Wireless-Fidelity), Wi-Fi Direct, and Wireless USB (Wireless Universal Serial Bus).

The operation unit 150 is a device that performs an air conditioning operation and an additional operation related thereto. In one example, the operation unit 150 may include a fan motor, a wind direction control unit, a display device, a lighting device, and the like.

As described above, the operation unit 150 may be controlled by the processor 130, and the control of the home appliance-related operation performed by the operation unit 150 may include the turn-on and turn-off control of the air conditioner 100, the operation control of the display device or the lighting device installed in the air conditioner 100, the control of the operation range (in one example, wind direction angle and direction), the operation intensity, the operation frequency of the air conditioner 100, etc.

Referring to FIG. 1, an operation of the air conditioner 100 is briefly described as follows.

The air conditioner 100 may have an intake hole (not shown) through which indoor air is sucked in and an outlet hole 190 through which the air sucked in through the intake hole is discharged back into the indoor space.

Wind direction control means such as a louver (not shown) and a vane (not shown) may be disposed at the outlet hole 190 so as to open and close the outlet hole 190 and control a wind direction of the discharged air. Under control of the processor 130, a motor or the like operates, and the angle and the direction of the wind direction control means may be changed. Accordingly, the wind direction of the air discharged through the outlet hole 190 may be adjusted. Further, controlling the operation of the wind direction control means such as the louver and the vane may allow a blowing direction and a blowing range of air flow to be adjusted.

For example, an orientation of the vane is fixed to face in one direction, such that blowing may be performed in one direction. Further, controlling the orientation of the vane so as to continuously change within a set range (i.e., a swing operation) may allow the blowing direction to be continuously changed. In addition, the blowing range may be adjusted by adjusting an angle range in which the swing operation of the vane is performed.

In one example, inside an indoor unit of the air conditioner 100, a fan (not shown) is installed to control the flow in which indoor air sucked through the intake hole is discharged to the indoor space through the outlet hole 190. In this regard, a rotation of the fan is controlled by a fan motor, and an operation of the fan motor is controlled by the processor 130.

Therefore, the processor 130 may control the fan motor and the wind direction control means such as the louver or the vane to control the direction of the flow (air flow) of the air discharged from the air conditioner 100. The processor 130 may control a speed of the fan motor to control an amount and a rate of the air flow, and may control the wind direction control means such as the louver or the vane to control the direction of the air flow. Further, the processor 130 may control the direction and rate of the airflow to quickly heat or cool a specific area.

The air conditioner 100 according to an embodiment of the present disclosure is configured to perform an air conditioning operation based on a user's location. In one example, the air conditioner 100 may perform an air conditioning operation, such as intensively delivering air current to an area where many users exist in the space, or indirectly transferring the air current to the area.

In order to perform the air conditioning operation based on the user's location, the user's location in the space should be accurately sensed. However, a picture frame containing a human picture may hang on a wall, or a TV displaying a person's shape, and the like may exist in the space. Thus, there is a possibility that the human picture, the person's shape, etc. may be falsely detected as the user existing in the space. Thus, the user's location-based airflow control may not be accurately performed due to the false detection, and thus, the user may experience inconvenience. Therefore, one purpose of the air conditioner 100 according to an embodiment of the present disclosure is to accurately detect the user among human-body shaped objects existing in the space and to perform correct user's location-based airflow control.

Hereinafter, a control method of the air conditioner 100 according to an embodiment of the present disclosure will be described in detail with reference to the following drawings.

FIGS. 3 to 7 are flowcharts of a control method of the air conditioner 100 according to an embodiment of the present disclosure.

In this regard, it is assumed that the control method of the air conditioner 100 is performed based on the processor 130, and the camera 110 acquires images of the space in real time or sequentially.

Hereinafter, each of steps of the process will be described in detail.

First, referring to FIG. 3, in Step S10, the processor 130 detects a position of an object in a space based on a first image acquired by the camera 110.

In this regard, the number of first images may be one or larger. In addition, object recognition is a concept including recognition of whether the object exists in an image. Further, the object may have a shape corresponding to that of the human-body. That is, the object may be the user (an occupant) existing in the indoor space, or an object in a shape of a human-body that exists in the indoor space but is not the user. Hereinafter, the object that is not the user but has a human-body shape is defined as a "user-similar object".

According to an embodiment of the present disclosure, the user-similar object may be a photograph or a picture of a human-body shape contained in the picture frame, and a photograph or a picture of a human-body shape disposed on the display device (in one example, a TV, a monitor, a smart phone, a tablet PC, etc.).

Next, in Step S20, the processor 130 detects at least one first area-of-interest among a plurality of areas constituting the space based on the object location detection result.

In this regard, the first area-of-interest is an area that is an area on which the home appliance-related operation (in one example, an air conditioning operation) performed by the air conditioner 100 is to be performed among the plurality of areas constituting the space. The first area-of-interest is an area of the image containing the object corresponding to the shape of the human-body. That is, one object may be contained in one first area-of-interest.

FIG. 8 is a diagram showing an image of an indoor space according to an embodiment of the present disclosure.

Referring to FIG. 8, the indoor space is a living room, an air conditioner 100 is installed inside the indoor space. An image of the indoor space may be acquired by the camera 110 installed in the air conditioner 100.

In this regard, (a) of FIG. 8 shows an image in which one user and one TV are located in the living room. In this case, the processor 130 may detect each of an area of the image where the user is located and an area of the image where the TV is located as the first area-of-interest.

FIG. 8 (b) shows an image in which one picture frame is located in the living room. In this case, the processor 130 may detect an area of the image where the picture frame is located as the first area-of-interest.

According to an embodiment of the present disclosure, Step S10 and Step S20 may detect a location of the object and detect at least one first area-of-interest using an algorithm model based on an artificial neural network.

An artificial intelligence (AI) is a field of computer science and information technology that studies a scheme to enable a computer to do thinking, learning, and self-development that may be done with human intelligence. The artificial intelligence (AI) allows the computer to be able to imitate intelligent behavior of a human.

The artificial intelligence does not exist by itself, but has many direct and indirect relationships with other fields of computer science. In particular, in modern times, attempts to introduce artificial intelligence elements in various fields of information technology to solve problems in those fields are being made very actively.

Machine learning is a field of the artificial intelligence, and is a field of study that imparts the computer the ability to learn without explicit programming.

Deep learning technology as a type of the machine learning refers to learning to a deep level in a multi-level manner based on data. The deep learning may represent a set of machine learning algorithms that extract core data from a plurality of data as the level increases.

FIG. 9 and FIG. 10 are diagrams for illustrating a concept of an artificial neural network (ANN).

Referring to FIG. 9, the artificial neural network may include an input layer, a hidden layer, and an output layer. Each of the layers includes a plurality of nodes, and each layer is connected to a next layer. Nodes of adjacent layers may be connected to each other in a weighted manner.

Referring to FIG. 10, a computer (machine) finds a certain pattern from input data 1010 to generate a feature map. The computer may extract a low-level feature 1020, a middle-level feature 1030, and a high-level feature 1040 to recognize the object, and output the result in 1050.

The artificial neural network may abstract a higher-level feature as a layer goes to a next layer.

Referring to FIG. 8 and FIG. 9, each node may operate based on an activation model, and an output value corresponding to an input value may be determined according to the activation model.

An output value of any node, for example, a node of the low-level feature 1020 may be input to a next layer connected to that node, for example, a node of the middle-level feature 1030. The node of the next layer, for example, the node of the middle-level feature 1030 may receive values output from a plurality of nodes of the low-level feature 1020.

In this regard, the input value of each node may be a value obtained by weighting an output value of a node of a previous layer. The weight may mean a connection strength between nodes. Further, the deep learning process may be viewed as a process of finding an appropriate weight.

In one example, an output value of any node, for example, a node of the middle-level feature 1030 may be input to a next layer connected to that node, for example, a node of high-level feature 1040. The node of the next layer, for example, the node of the high-level feature 1040 may receive values output from a plurality of nodes of the middle-level feature 1030.

The artificial neural network may extract feature information corresponding to each level using a learned layer corresponding to each level. The artificial neural network may sequentially abstract the features and recognize a predetermined object based on the top-level feature information.

For example, regarding a face recognition process based on the deep learning, the computer may first distinguish bright pixels from dark pixels according to brightness of the pixels of the input image, and then may distinguish simple shapes such as borders and edges, and then may distinguish more complex shapes and objects. Finally, the computer may find out a shape that defines a human face.

The deep learning structure according to the present disclosure may use various known structures. For example, the deep learning structure according to the present disclosure may be a convolutional neural network (CNN), a recurrent neural network (RNN), a deep belief network (DBN), and the like.

RNN is widely used in natural language processing, etc., and is an effective structure for processing time-series data that changes over time, and may stack a layer at each moment to construct an artificial neural network structure.

DBN is a deep learning structure constructed by stacking multiple layers of RBM (Restricted Boltzman Machine) as a deep learning technique. RBM learning is repeated to obtain a certain number of layers, such that a DBN having the number of layers may be configured.

CNN is a structure that is particularly used in a field of object recognition, and is a model that simulates a human brain function based on the assumption that when a human recognizes an object, the brain extracts basic features of the object, and then recognizes the object based on results of complex calculations in the brain.

In one example, the artificial neural network may be trained by adjusting a weight of a connection line between nodes so that a desired output is produced from a given input. Further, the artificial neural network may continuously update the weight value based on a learning result. Further, a scheme such as back propagation may be used for training the artificial neural network.

In short, the processor 130 according to an embodiment of the present disclosure may detect a position of at least one object and detect at least one area-of-interest using the various deep learning structures as described above. That is, the processor 130 according to an embodiment of the present disclosure may detect the position of at least one object in the space and at least one first area-of-interest using the first image obtained through the camera 110 as input data to the artificial neural network pre-trained via machine learning. For example, the CNN structure widely used in recognition of the object within the image may be used. However, the present disclosure is not limited thereto.

FIG. 4 is a flowchart showing detailed steps of Step S20.

In Step S21, the processor 130 receives human-body detection data including a recognition result of a position of the object.

In Step S22, the processor 130 accumulates the input human-body detection data.

In Step S23, the processor 130 counts the accumulated human-body detection data and determines whether a certain number of data (M) or larger has been accumulated based on the counting result.

When the certain number (M) of data or larger has been accumulated, the processor 130 generates a histogram at Step S24.

In Step S25, the processor 130 inputs the generated histogram as input data to the artificial neural network algorithm based on machine learning to divide the plurality of areas into a living area and a non-living area.

In this regard, the living area corresponds to the first area-of-interest, and Step S25 corresponds to a step of detecting at least one first area-of-interest. The machine learning may employ techniques such as SVM (Support Vector Machine) and Adaboost. More preferably, the machine learning may employ the deep learning technique.

That is, the processor 130 may generate a histogram for each plurality of areas, and use the generated histogram as input data to the artificial neural network pre-trained via the machine learning to distinguish a living area from a non-living area. In one example, the processor 130 may further subdivide the living areas into a resident living area and a non-resident living area.

More specifically, the air conditioner 100 according to an embodiment of the present disclosure may divide the plurality of areas of the space into the living area and the non-living area based on a frequency at which the object (including the user) is recognized, that is, the number of times the object is detected per unit time, or a time at which a person is detected.

For example, the processor 130 may distinguish a divided area in which the object is detected at least once from a divided area in which the object is not detected at all. Thus, the processor 130 may classify the area in which the object is detected as the living area, and may classify an area where no object is detected as the non-living area.

In this regard, the criterion for distinguishing the living and non-living areas from each other includes whether the occupant has been detected in that area. However, when the number of human-body detections are too small in an area, the area may not be recognized as an area where the object lives, that is, the area may be recognized as the non-living area.

According to an embodiment, the living areas may be divided into a resident living area and a non-resident living area based on the number of times the object is detected consecutively or a time at which the object is detected consecutively.

For example, the processor 130 may divide the living areas into the resident living area and the non-resident living area based on the number of times the object is detected consecutively or a time at which the object is detected consecutively. Thus, the processor 130 may divide the living areas into the two subdivided areas: the resident living area and the non-resident living area.

In one example, Step S26 and Step S27 are optional steps.

In order to further increase the accuracy at which the area is classified as the living area, in Step S26, the processor 130 repeatedly performs the division of the areas into the living and non-living areas. In step S27, the processor 130 collects the plurality of division results and finally classifies the plurality of areas constituting the space as the living areas and the non-living areas based on the collected results. That is, when the number of the times of the divisions of the areas into the living and non-living areas increases, and thus a certain number of division results are accumulated, the final result may be derived to secure the reliability of the living area recognition result. Further, a temporary error of the non-living area caused by the human-body detection error may be eliminated.

Referring back to FIG. 3, in Step S30, the processor 130 controls the operation unit 150 to perform a first home appliance-related operation based on at least one first area-of-interest.

In this regard, the home appliance-related operation may be an operation related to air conditioning. In one example, the home appliance-related operation may include the control of the range, the intensity, and the frequency of the operation of the air conditioner 100, and the control of the display device or the lighting device installed in the air conditioner 100.

That is, in Step S20 and Step S30, the processor detects an object corresponding to a shape of a human-body in the space based on the first image, and controls the operation unit 150 to perform the first home appliance-related operation on the detected object.

In this regard, the object corresponding to the shape of the human-body may be the user or the user-similar object. Until Step S40 as described below is performed, the processor 130 cannot distinguish the user and the user-similar object from each other. Accordingly, the processor 130 may perform the first home appliance-related operation on all of the first areas-of-interest.

Subsequently, in Step S40, the processor 130 determines a second area-of-interest from the at least one first area-of-interest, based on a second image received after the first image. The second area-of-interest refers to an area in which the object is the user. In this regard, the number of second images may be plural.

That is, in Step S40, the processor may remove the first area-of-interest containing the user-similar object from the at least one first area-of-interest detected in Step S30 and may detect only the first area-of-interest containing the user. In other words, Step S40 is a step of determining at least one second area-of-interest as the first area-of-interest containing the user among the at least one first area-of-interest.

According to an embodiment of the present disclosure, in step S40, the processor 130 may detect the second area-of-interest from the at least one first area-of-interest based on a cumulative value of difference images between sequentially obtained second images.

In Step S50, the processor 130 controls the operation unit 150 to perform a second home appliance-related operation based on at least one second area-of-interest.

Step S40 and Step S50 are steps for specifying only the user among the objects existing in the space based on the second image, and for controlling the operation unit 150 to perform the second home appliance-related operation on the specified user.

In this regard, the first home appliance-related operation and the second home appliance-related operation are different from each other. That is, the air conditioner 100 of the present disclosure performs air conditioning operation based on the user's location. Thus, the home appliance-related operation (the first home appliance-related operation) performed on all the first areas-of-interest and the home appliance-related operation (the second home appliance-related operation) performed on some of the first areas-of-interest (i.e., the second area-of-interest) are different from each other.

In summary, in a first time period corresponding to Step S20 and Step S30, the user and the user-similar object have not yet been distinguished from each other. Thus, the processor may control the operation unit 150 to perform the first home appliance-related operation on all of objects corresponding to the shape of the human-body. Thereafter, in a second time period corresponding to Step S40 and Step S50, the user and the user-similar object are distinguished from each other based on the analysis of the second image. Thus, the processor may control the operation unit 150 to perform the second home appliance-related operation only on the user.

Hereinafter, a process of Step S40 will be described in more detail with reference to FIGS. 5 to 7.

FIG. 5 is a flowchart showing detailed steps of Step S40. In this regard, Step S40 is performed based on the second images which are acquired sequentially. In step S41, the processor 130 generates a difference image.

In this regard, the difference image is an image corresponding to a difference between an image at a first time-point and an image at a second time-point before the first time-point. In this regard, the first time-point may be a current time-point, and the second time-point may be a previous time-point. That is, Step S41 is a step of generating the difference image between an image (a current image frame) of a current time-point and an image (a previous image frame) of a previous time-point.

According to an embodiment of the present disclosure, the difference image may be an image corresponding to a difference between a grayscale image of the image of the first time-point and a grayscale image of the image of the second time-point. In this regard, the grayscale image is an image whose a pixel value is an average value of color values of R, G, and B. In this case, the difference image may be expressed based on a following Equation 1:

$$D(x,y)=|I(x,y)-T(x,y)| \quad \text{[Equation 1]}$$

In this regard, $D(x, y)$ denotes the difference image, $I(x, y)$ denotes the grayscale image of the image of the first time-point, $T(x, y)$ denotes the grayscale image of the image of the second time-point, and $(x, y)$ means a specific coordinate in the image.

FIG. 11 is a diagram showing an example of a difference image according to the present disclosure.

Referring to FIG. 11, a white pixel value in the difference image indicates that a difference between the image of the first time-point and the image of the second time-point is greater. Accordingly, objects corresponding to two areas marked in white are moving objects. Thus, the two areas correspond to the first areas-of-interest.

Referring back to FIG. 5, in Step S42, the processor 130 accumulates the difference images to generate a cumulative difference image.

In this regard, the cumulative difference image may correspond to an average image of two or more difference images. In one example, a current cumulative difference image may be generated by averaging a previously generated cumulative difference image and a currently generated difference image with each other. The cumulative difference image may be stored in the memory 120.

In Step S43, the processor 130 determines whether the number of the two or more difference images constituting the cumulative difference image is n or larger. In this regard, n corresponds to an integer greater than or equal to 2.

When the number of the two or more difference images constituting the cumulative difference image is smaller than n, Step S41 and Step S42 are performed again. Conversely, when the number of the two or more difference images constituting the cumulative difference image is n or larger, the cumulative difference image is determined.

That is, Steps S41 to Step S43 correspond to steps of generating the cumulative difference image based on the plurality of second images sequentially acquired by the camera 110 for a preset time duration. In this regard, the second image corresponds to the image acquired after the first image. Accuracy of user detection may be improved by generating the cumulative difference image using a large number of images.

FIG. 12 is a diagram showing an example of a cumulative difference image according to an embodiment of the present disclosure.

The cumulative difference image of (a) of FIG. 12 is the cumulative difference image of the images of (a) of FIG. 8, while the cumulative difference image of (b) of FIG. 12 is the cumulative difference image of the images of (b) of FIG. 8.

Referring back to FIG. 5, in Step S44, the processor 130 compares a pixel value of at least one first area-of-interest in the cumulative difference image with a preset critical pixel value and detects at least one second area-of-interest from the at least one first area-of-interest, based on the comparing result.

In this regard, the critical pixel value includes a first critical pixel value, a second critical pixel value, and a third critical pixel value. In this regard, the first critical pixel value may be a low pixel value, and the second and third critical pixel values may be high pixel values. The first to third critical pixel values may be experimentally determined. Further, the comparison between the pixel values may be performed on each pixel or may be performed based on an average of pixel values existing in an area.

FIG. 6 is a flowchart showing an example of detailed steps of Step S44.

In Step S61, the processor 130 determines whether a pixel value of one of the first areas-of-interest is greater than or equal to the first critical pixel value.

When the pixel value of one of the first areas-of-interest is smaller than the first critical pixel value, the processor 130 determines that said one of the first areas-of-interest is the first area-of-interest containing the picture frame in Step S62.

Conversely, when the pixel value of one of the first areas-of-interest is greater than or equal to the first critical pixel value, the processor 130 determines whether the pixel value of one of the first areas-of-interest is greater than or equal to the second critical pixel value in Step S63.

In this regard, when the pixel value of one of the first areas-of-interest is smaller than the second critical pixel value, the processor 130 determines that said one of the first areas-of-interest is the first area-of-interest in which the user is contained, that is, the second area-of-interest in Step S64.

Conversely, when the pixel value of one of the first areas-of-interest is greater than or equal to the second critical pixel value, the processor 130 determines that said one of the first areas-of-interest is the first area-of-interest in which the display device is contained.

Summarizing the contents as described above, when the pixel value of one of the first areas-of-interest is greater than the first critical pixel value and is smaller than the second critical pixel value, the processor 130 may determine that said one of the first areas-of-interest is the second area-of-interest. A more detailed description thereof is as follows.

Referring to FIG. 11 and FIG. 12, the object in the area displayed in the white in the difference image has a larger movement amount. The object in the area displayed in the black in the difference image has a smaller movement amount.

The object contained in the first area-of-interest with the pixel value lower than the first critical pixel value has little movement. In this regard, the photo or the picture contained in the picture frame is still and therefore is motionless. Accordingly, the first area-of-interest having the low pixel value may correspond to the picture frame or the picture or photo contained in the picture frame.

The object contained in the first area-of-interest having a pixel value higher than the first critical pixel value has a lot of motion. Therefore, the first area-of-interest with the high pixel value may be the first area-of-interest containing the user (i.e., the second area-of-interest) or the first area-of-interest containing the display device.

The object in the first area-of-interest containing the display device may have a larger movement amount that a movement amount of the object in the first area-of-interest containing the user. That is, the human-body displayed on the display device is often continuously moving due to screen switching, etc., and thus has the larger movement amount than that of the user existing in an indoor space. Accordingly, the first area-of-interest having a pixel value higher than the second critical pixel value may correspond to the picture or the photo displayed on the display device.

Therefore, when the pixel value of one of the first areas-of-interest is smaller than the first critical pixel value, the processor 130 determines the object in said one of the first areas-of-interest as the photo or the picture of the human-body contained in the picture frame, and thus removes said one of the first areas-of-interest corresponding to the picture frame from a group of areas-of-interest. When the pixel value of one of the first areas-of-interest is greater than the second critical pixel value, the processor 130 determines the object in said one of the first areas-of-interest as a photo or a picture displayed on the display device, and thus removes said one of the first areas-of-interest corresponding to the display device from a group of areas-of-interest. In this regard, "removing said one of the first areas-of-interest from the area-of-interest group" may correspond to "determination that said one of the first areas-of-interest is not the second area-of-interest".

FIG. 13 summarizes a concept of determining the first area-of-interest.

According to another embodiment of the present disclosure, in Step S44, the processor 130 may detect a quadrangular shape from the cumulative difference image, and may detect the second area-of-interest further based on the detected quadrangular shape.

FIG. 7 is a flowchart showing another example of the detailed steps of Step S44.

In Step S71, the processor 130 determines whether one of the first areas-of-interest has a rectangular shape.

When one of the first areas-of-interest is not a rectangular shape, Step S72 to Step S75 are performed. Conversely, when one of the first areas-of-interest is a rectangular shape, Step S76 and Step S77 are performed.

Specifically, when one of the first areas-of-interest is not a rectangular shape, the processor 130 determines whether a pixel value of said one of the first areas-of-interest is greater than or equal to the first critical pixel value in Step S72, In this regard, when the pixel value of said one of the first areas-of-interest is smaller than the first critical pixel value, the processor 130 determines that said one of the first areas-of-interest is the first area-of-interest containing the picture frame in Step S73.

Further, when the pixel value of said one of the first areas-of-interest is greater than or equal to the first critical pixel value, the processor 130 determines whether the pixel value of said one of the first areas-of-interest is greater than or equal to the second critical pixel value in Step S74.

When the pixel value of said one of the first areas-of-interest is smaller than the second critical pixel value, the processor 130 determines that said one of the first areas-of-interest is the first area-of-interest in which the user is contained, that is, the second area-of-interest in Step S75.

Conversely, when the pixel value of said one of the first areas-of-interest is greater than the second critical pixel value, the processor 130 returns to Step S71. In this case, the processor re-determines, based on an updated cumulative difference image, whether one of the first areas-of-interest is the second area-of-interest.

In one example, when one of the first areas-of-interest is a rectangular shape, the processor 130 determines whether a difference between pixel values inside and outside said one of the first areas-of-interest is greater than or equal to the third critical pixel value in Step S76.

When the difference between the pixel values inside and outside said one of the first areas-of-interest is greater than or equal to the third critical pixel value, the processor 130 determines that said one of the first areas-of-interest is the first area-of-interest containing the display device in Step S77.

Conversely, when the difference between the pixel values inside and outside of said one of the first areas-of-interest is smaller than the third critical pixel value, the processor 130 returns to Step S71. In this case, the processor re-determines, based on the updated cumulative difference image, whether the first area-of-interest is the second area-of-interest.

The above descriptions will be more specifically described as follows.

Referring to FIG. 12, the user and the picture frame are present in an irregular form in the cumulative difference image, while the display device is present in a regular square shape in the cumulative difference image.

Further, referring to FIG. 12, each of the user and the display device has movement and a shape in the cumulative difference image (i.e., as is displayed in a bright color in the cumulative difference image), while the picture frame has no movement and shape in the cumulative difference image. (i.e., as is displayed in a dark color in the cumulative difference image).

Further, referring to (a) of FIG. 12, the user has a smaller movement amount in the cumulative difference image such that the cumulative difference image gradually becomes blurred, whereas the motion of the object displayed on the display device in the cumulative difference image becomes more and more clear due to screen switching.

Therefore, when one of the first areas-of-interest in the cumulative difference image has a rectangular shape and the pixel value of said one first area-of-interest is greater than or equal to the second critical pixel value, the processor 130 may determine the object in said one first area-of-interest as a photo or a picture displayed on the display device.

Further, the difference between the pixel value inside the square shape and the pixel value outside the square shape in the cumulative difference image is great. Therefore, when one of the first areas-of-interest in the cumulative difference image is a square shape, the pixel value inside the first area-of-interest of the square shape is greater than the second critical pixel value, and the difference between the pixel value inside the first area-of-interest of the square shape and the pixel value outside the first area-of-interest of the square shape is greater than the third critical pixel value, the processor 130 may determine the object in said one first area-of-interest of the square shape as a photo or a picture displayed on the display device. In this regard, the pixel outside the first area-of-interest of the rectangular shape may be a pixel adjacent to an edge of the rectangular shape.

In short, Step S40 is a process of determining whether an object existing in each of at least one first area-of-interest is the user, based on the movement type of the object in the at least one first area-of-interest in the image. That is, in Step S40, the first area-of-interest where the user exists is maintained in a group of the first areas-of-interest contained in the cumulative difference image, while the first area-of-interest where the user-similar object exists is removed from the group. In this regard, the motion type may be determined based on the pixel value of the area-of-interest of the cumulative difference image, and the critical pixel value, and may be further determined based on the rectangular shape detection result.

In this case, when the movement type of the object in the first area-of-interest is 'a first movement type with no movement', the processor 130 may determine the object in the first area-of-interest as a photo or a picture of a human-body contained in the picture frame, and may remove the first area-of-interest corresponding to the picture frame from the group of the first areas-of-interest. Otherwise, when the movement type of the object in the first area-of-interest is 'a second movement type having a large movement amount', the processor 130 may determine the object in the first area-of-interest as a photo or a picture displayed on the display device, and may remove the first area-of-interest corresponding to the display device from the group. Otherwise, when the motion type of the object in the first area-of-interest is 'a third motion type having a certain movement amount', the processor 130 determines the first area-of-interest as the first area-of-interest where the user exists, that is, the second area-of-interest, and maintains the first area-of-interest where the user exists in the group.

In one example, according to this embodiment of the present disclosure, in Step S50, the processor 130 may distinguish the living area (i.e., the second area-of-interest) and the non-living area from each other and may control the operation unit 150 to generate airflow in a different manner in the living area and the non-living area. In this regard, the processor 130 may control the fan motor to control the intensity of the air flow, and may control the wind direction control means such as the vane, the louver, etc. as disposed in the outlet hole 190 to control the direction and range of the air flow.

For example, the air conditioner 100 may operate in an intensive cooling and heating mode for intensively delivering airflow toward the resident living area among the living areas, in a direct cooling/heating mode for delivering the airflow to both the resident living area and the non-resident living area among the living areas, and in an indirect cooling/heating mode to prevent direct air flow to the resident living area among the living areas.

In summary, the air conditioner 100 according to an embodiment of the present disclosure may detect the second area-of-interest as the first area-of-interest containing the user, based on the movement type of the object in the area-of-interest. Specifically, the air conditioner 100 according to an embodiment of the present disclosure detects at least one first area-of-interest containing an object corresponding to a shape of a human-body, and removes the first area-of-interest containing the user-similar object, but detects the first area-of-interest containing only the user (i.e., the second area-of-interest), based on the movement type of the at least one first area-of-interest. In this regard, the air conditioner 100 may be controlled based on the area-of-interest containing the user, so that user-based home appliance-related operation may be implemented.

Further, according to an embodiment of the present disclosure, the air conditioner 100 may analyze the cumulative difference image of the sequentially obtained images and may determine whether the human-body present in the image is the user (the occupant) or a human-body displayed on the picture frame or the display device, based on the analyzing result. Thus, the user may be detected more accurately.

Further, the air conditioner 100 according to an embodiment of the present disclosure may more accurately detect the user within the image and thus may provide the user with convenience in using the home appliance. Further, the air conditioner 100 according to an embodiment of the present disclosure may accurately detect the user present in the space to prevent the error occurring when providing the home appliance-related operation based on the user's location.

Further, the embodiments of the present disclosure may be implemented in the form of program instructions that may be executed via various computer means and may be recorded in a computer readable medium. The computer readable medium may store therein program instructions, data files, data structures, etc. alone or in combination with each other. The program instructions recorded in the medium may be specially designed and configured for implementing the present disclosure, or may be known to those skilled in the computer software. Examples of the computer-readable recording media may include magnetic media such as hard disks, floppy disks and magnetic tapes, optical media such as CD-ROMs and DVDs, magneto-optical media such as floptical disks, and a hardware device specially configured to store therein and execute the program instructions, such as ROM, RAM, flash memory, etc. Examples of the program instructions may include high-level language codes that may be executed by a computer using an interpreter, as well as machine language codes such as those produced by a compiler. The hardware device as described above may be configured to operate as at least one software module to perform the operations of one embodiment of the present disclosure, or vice versa.

As described above, the present disclosure has been set forth based on specific details such as the specific components and limited embodiments and drawings. However, these are only provided to help the overall understanding of the present disclosure. The present disclosure is not limited to the above embodiment, and various modifications and variations may be made based the above descriptions by those having ordinary knowledge in the field to which the present disclosure belongs. Therefore, the spirit of the present disclosure should not be limited to the described embodiments. Not only the claims to be described later, but also all equivalents and modifications to the claims belong to the scope of the ideal of the present disclosure.

What is claimed is:

1. A home appliance, comprising:
  a camera configured to obtain a plurality of images of a space;
  a processor configured to execute at least one instruction; and
  an operation device configured to perform a first home appliance-related operation and to perform a second home appliance-related operation, wherein the processor is configured to:
    receive the plurality of images obtained by the camera;
    determine that at least one first area-of-interest contains an object corresponding to a shape of a human-body from among a plurality of areas forming the space, based on a first image among the plurality of images;
    generate a cumulative difference image based on a plurality of second images that is sequentially obtained by the camera for a predetermined time duration;
    determine at least one second area-of-interest that contains a user from among the at least one first area-of-interest, based on the cumulative difference image; and
    control the operation device to perform the second home appliance-related operation based on the at least one second area-of-interest, wherein the first home appliance-related operation is different from the second home appliance-related operation, and wherein the plurality of second images is obtained after the first image is obtained.

2. The home appliance of claim 1, wherein the processor is further configured to:
  control the operation device to perform the first home appliance-related operation based on the at least one first area-of-interest.

3. The home appliance of claim 1, wherein the object is at least one of the user or a user-similar object, and wherein the user-similar object is an image or a picture of part of a human within a picture frame or displayed on a display device.

4. The home appliance of claim 1, wherein the cumulative difference image corresponds to an average image of a plurality of difference images, and wherein the difference image is an image corresponding to a difference between an image at a first time-point and an image at a second time-point which is before the first time-point.

5. The home appliance of claim 4, wherein the difference image is an image corresponding to a difference between a grayscale image of the image at the first time-point and a grayscale image of the image at the second time-point.

6. The home appliance of claim 1, wherein the processor is configured to compare a pixel value of the first area-of-interest with a preset critical pixel value, and to determine the at least one second area-of-interest based on a result of the comparing.

7. The home appliance of claim 6, wherein the preset critical pixel value includes a first critical pixel value and a second critical pixel value, wherein when a pixel value of one of the at least one first area-of-interest is greater than the first critical pixel value and the pixel value of said one first area-of-interest is smaller than the second critical pixel value, the processor is configured to determine said one first area-of-interest as the second area-of-interest.

8. The home appliance of claim 6, wherein the preset critical pixel value includes a first critical pixel value and a second critical pixel value, wherein when a pixel value of one of the at least one first area-of-interest is smaller than the first critical pixel value or the pixel value of said first area-of-interest is greater than the second critical pixel value, the processor is configured to determine that said one first area-of-interest is not the second area-of-interest.

9. The home appliance of claim 8, wherein when the pixel value of said one first area-of-interest is smaller than the first critical pixel value, the processor is configured to determine that the object contained in said one first area-of-interest is a photo or a picture of part of a human within a picture frame, wherein when the pixel value of said one first area-of-interest is greater than the second critical pixel value, the processor is configured to determine that the object contained in said one first area-of-interest is a photo or a picture displayed on a display device.

10. A home appliance, comprising:
  a camera configured to obtain a plurality of images of a space;
  a processor configured to execute at least one instruction; and
  an operation device configured to perform a first home appliance-related operation and to perform a second home appliance-related operation, wherein the processor is configured to:
    receive the plurality of images obtained by the camera;
    determine that at least one first area-of-interest contains an object corresponding to a shape of a human-body from among a plurality of areas forming the space, based on the first image;

obtain a cumulative difference image based on a plurality of second images that is sequentially obtained by the camera for a predetermined time duration;

determine at least one second area-of-interest that contains a user from among the at least one first area-of-interest, based on the cumulative difference image; and control the operation device to perform a predetermined home appliance-related operation based on the at least one second area-of-interest, wherein the processor is configured to detect a quadrangular shape within the cumulative difference image, and to determine the second area-of-interest further based on the detected quadrangular shape.

11. The home appliance of claim 10, wherein when a pixel value of one of the at least one first area-of-interest is greater than a first critical pixel value and the pixel value of said one first area-of-interest is smaller than a second critical pixel value, the processor is configured to determine said one first area-of-interest as the second area-of-interest, and wherein when one of the at least one first area-of-interest has a rectangular shape, and a pixel value inside the first area-of-interest having the rectangular shape is greater than the second critical pixel value, and a difference between a pixel value inside the first area-of-interest having the rectangular shape and a pixel value outside the first area-of-interest having the rectangular shape is greater than a third critical pixel value, the processor is configured to determine that said one first area-of-interest is not the second area-of-interest.

12. The home appliance of claim 1, wherein the processor is configured to determine the at least one first area-of-interest based on the first image input to data pre-learned via machine learning.

13. The home appliance of claim 1, wherein the camera is disposed on an outer surface of the home appliance.

14. A method for controlling a home appliance that includes a processor and a camera, the method comprising:

receiving, from the camera, a plurality of images of a space;

determine that at least one first area-of-interest contains an object corresponding to a shape of a human body from among a plurality of areas forming the space, based on a first image among the plurality of images;

performing a first home appliance-related operation, based on the at least one first area-of-interest;

generating a cumulative difference image based on a plurality of second images that is sequentially obtained by the camera for a predetermined time duration;

determining at least one second area-of-interest that contains a user from among the at least one first area-of-interest, based on the cumulative difference image; and performing a second home appliance-related operation only with respect to the user based on the at least one second area-of-interest, wherein the first home appliance-related operation is different than the second home appliance-related operation, and wherein the second image is obtained after the first image is obtained.

15. The method of claim 14, wherein the plurality of objects includes the user and a user-similar object, and wherein the user-similar object is an image or a picture of part of a human within a picture frame or displayed on a display device.

16. The method of claim 14, further comprising comparing a pixel value of the first area-of-interest with a preset critical pixel value, and determining the at least one second area-of-interest based on a result of the comparing.

17. The method of claim 16, further comprising detecting a quadrangular shape within the cumulative difference image, and determining the second area-of-interest further based on the detected quadrangular shape.

18. The method of claim 16, wherein the preset critical pixel value includes a first critical pixel value and a second critical pixel value, and wherein the determining at least one second area-of-interest comprises, when a pixel value of one of the at least one first area-of-interest is greater than the first critical pixel value and the pixel value of said one first area-of-interest is smaller than the second critical pixel value, determining said one first area-of-interest as the second area-of-interest.

* * * * *